US008276104B2

(12) United States Patent
Emmanuel et al.

(10) Patent No.: US 8,276,104 B2
(45) Date of Patent: Sep. 25, 2012

(54) STRESS REDUCTION ON VIAS AND YIELD IMPROVEMENT IN LAYOUT DESIGN THROUGH AUTO GENERATION OF VIA FILL

(75) Inventors: Gregory Sylvester Emmanuel, Penang (MY); Hui-Peng Ong, Penang (MY); Kian-Boon How, Melaka (MY); Joseph Lin, Atlanta, GA (US)

(73) Assignee: Spansion LLC, Sunnyvale, CA (US)

( * ) Notice: Subject to any disclaimer, the term of this patent is extended or adjusted under 35 U.S.C. 154(b) by 77 days.

(21) Appl. No.: 12/964,594

(22) Filed: Dec. 9, 2010

(65) Prior Publication Data

US 2012/0151430 A1    Jun. 14, 2012

(51) Int. Cl.
*G06F 17/50*    (2006.01)
(52) U.S. Cl. .......... 716/54; 716/112; 716/126; 716/135; 716/56
(58) Field of Classification Search ............... 716/54, 716/56, 112, 126, 135
See application file for complete search history.

(56) References Cited

U.S. PATENT DOCUMENTS

| 5,157,618 | A  | * | 10/1992 | Ravindra et al. | 716/50 |
| 5,798,937 | A  | * | 8/1998  | Bracha et al. | 716/54 |
| 5,984,510 | A  | * | 11/1999 | Guruswamy et al. | 716/54 |
| 6,209,123 | B1 | * | 3/2001  | Maziasz et al. | 716/123 |
| 7,096,447 | B1 | * | 8/2006  | Li et al. | 716/112 |
| 7,215,563 | B2 | * | 5/2007  | Brandon et al. | 365/94 |
| 7,272,810 | B2 | * | 9/2007  | Orita | 326/80 |
| 7,574,685 | B1 | * | 8/2009  | Dong et al. | 716/118 |
| 2008/0250379 | A1 | * | 10/2008 | Takaoka et al. | 716/18 |
| 2011/0055785 | A1 | * | 3/2011  | Chakanakar et al. | 716/126 |

* cited by examiner

*Primary Examiner* — Naum Levin

(57) ABSTRACT

A process for automated via doubling in a layout of a semiconductor device, comprising: selecting at least one cell of the layout for via doubling, wherein the at least one cell comprises at least two metal layers; selecting at least two metal layers of the at least one cell for via doubling; selecting metal/metal intersection areas out of the at least two metal layers, wherein a metal/metal intersection comprises an existing via interconnecting a plurality of metal layers; and dimensionally fitting additional vias into the selected metal/metal intersection areas, wherein the additional vias are placed into the layout.

21 Claims, 6 Drawing Sheets

STRESS REDUCTION ON VIAS AND YIELD IMPROVEMENT IN LAYOUT DESIGN THROUGH AUTO GENERATION OF VIA FILL

TECHNICAL FIELD

The present disclosure relates generally to the field of semiconductor manufacturing and more specifically to stress reduction on contacts and yield improvement in layout design through improved via fill processes.

BACKGROUND

The trend in the semiconductor industry today is the production of ever increasingly more capable semiconductor components, while decreasing component size and total semiconductor package height. In other words, increased semiconductor chip density. The production of such semiconductor devices reveals new and challenging design and manufacturing problems. Such problems are seen in deep sub-micron fabrication techniques, where denser chip designs and shorter turn-around time requirements can lead to quality control issues. These quality control issues include possible silicon failure and the resultant re-masking, thereby increasing production costs.

Printed circuit boards, such as sub-micron layout designs, make use of vertical electrical inter-connections, or vias. Vias as well as other forms of electrical contacts provide electrical connection between different metal layers of a printed circuit board.

Defects associated with these vias may contribute to yield loss. These defects can be categorized into three areas: random defects, systematic defects, and parametric defects.

Random defects (e.g., particle defects) are those defects caused by by-products of the manufacturing process itself. Manufacturing defects would include, for example, an airborne particle, or more likely, a particle that breaks off during polishing. If such a particle lands on or near a via, it can block that via from functioning properly.

Systematic defects (e.g., pattern dependencies in the layout) are those defects associated with particular design patterns or layouts. For example, when copper was introduced in the manufacturing process, air bubbles became a problem because they have a tendency to accumulate at areas of stress, such as a via insertion point. Such areas of stress from the manufacturing process caused by the layout patterns can void a via.

Parametric defects (e.g., timing related issues) are those defects resulting from interconnection parasitic effects and device physics. For example, when a via becomes partially blocked, it produces a greater resistance (called a resistive via), and its performance is thereafter inhibited.

SUMMARY OF THE INVENTION

This present invention provides a solution to the challenges inherent in the generation of additional vias (via doubling) in sub-micron layout designs. In a method according to one embodiment of the present invention, a method of automatic via doubling in a layout of a semiconductor device is disclosed. At least one cell of the layout for via doubling is selected, wherein the at least one cell comprises at least two metal layers. At least two metal layers of the at least one cell for via doubling are selected. Metal/metal intersection areas out of the at least two metal layers are extracted, wherein a metal/metal intersection comprises an existing via. Lastly, as many additional vias as possible are dimensionally fitted into the identified metal/metal intersection areas of the layout.

BRIEF DESCRIPTION OF THE DRAWINGS

The present invention will be better understood from a reading of the following detailed description, taken in conjunction with the accompanying drawing figures in which like reference characters designate like elements and in which.

DETAILED DESCRIPTION

Figure 1A:
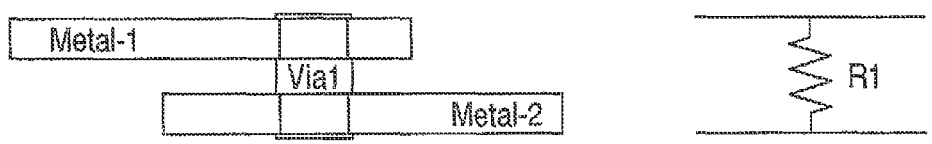
FIGS. 1A and 1B illustrate schematic cross-sections of a semiconductor device in accordance with an embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

NOTATION AND NOMENCLATURE

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system or similar electronic computing device, that manipulates and transforms data represented as physical (electronic) quantities within the computer system's registers and memories and other computer readable media into other data similarly represented as physical quantities within the computer system memories or registers or other such information storage, transmission or display devices. When a component appears in several embodiments, the use of the same reference numeral signifies that the component is the same component as illustrated in the original embodiment.

This present invention provides a solution to the increasing challenges inherent in sub-micron layout designs. In particular, production yield may be improved by diminishing the effect of via related defects (i.e., random defects, systematic defects, and parametric defects), by the insertion of a second (or more) via as "insurance" in the areas surrounding an existing via. In other words, two or more vias will now be performing the function originally performed by only a single via. Therefore if one of the vias is defective in an area provided with a plurality of vias, one or more vias are still performing the required function. Such insertion of additional vias in layout designs is also referred to as "via doubling" or "via fill."

Figure 1B:
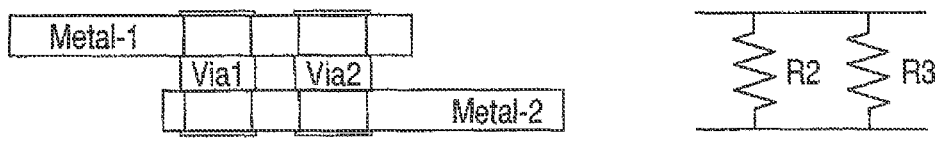

FIGS. 1A and 1B are cross-sectional views of a comparison of a single via and a plurality of vias (FIG. 1A illustrates a single via, while FIG. 1B illustrates two vias). A substrate and other structures have been removed for the sake of clarity. Further, the components illustrated in FIGS. 1A and 1B have been exaggerated for the sake of clarity. By providing an alternative path, a second via (as illustrated in FIG. 1B) reduces stress (resistance reduction) and improves performance. Such stress or resistance reduction can be directly linked to via path resistance. For the examples in FIGS. 1A and 1B, assume sheet resistance for each via is 2Ω. Such resistance is also illustrated in FIG. 1A as a single resistor, R1. Therefore, for a single via, Rtotal=R1=2Ω. However, the effective resistance for two vias is less than for a single via, as the resistance is distributed across the two vias. Resistance for a pair of vias is also illustrated in FIG. 1B as a pair of resistors R2 & R3 in parallel. For a pair of vias, Rtotal=(R2+R3)/(R2*R3)=4/4=1Ω. Using multiple vias on the same metal intersection between two metal layers actually reduces total resistance across the connected areas directly splitting the current stress across the vias; in this case by half; and more stress is reduced if multiple vias are used (e.g. 3 or more). Therefore, the elimination of single via usage, which is highly resistance, where possible, with no additional metal routing labor is highly desired.

Figure 2:
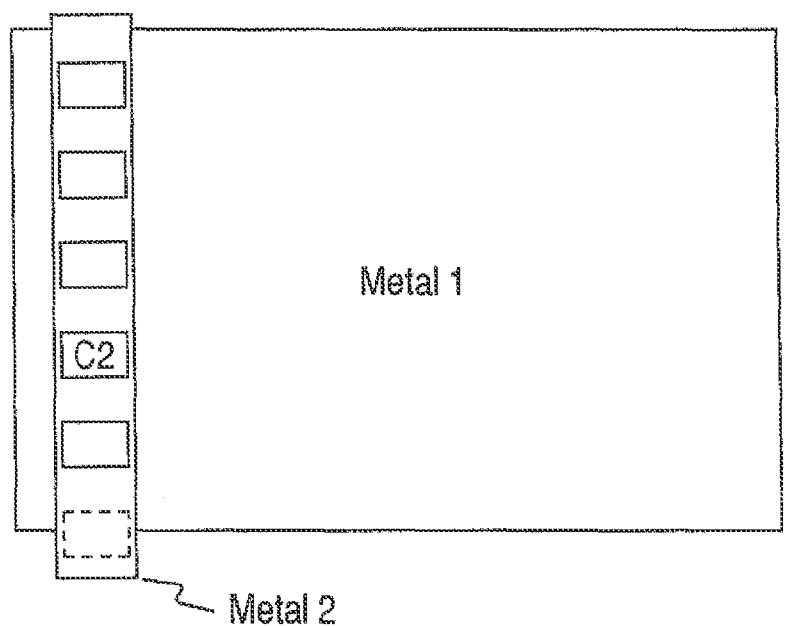
FIG. 2 illustrates a schematic top-down view of a semiconductor device in accordance with an embodiment of the present invention.

FIG. 2 is a top-down view illustrating the placement of additional vias on a thin metal. As illustrated in FIG. 2, additional vias (grey squares) can be placed alongside the original via C2 so long as design considerations are met. These additional vias are placed following minimum spacing requirements which are discussed in more detail below. Meanwhile, the design considerations prevent a via from being placed at the dashed location, as there is not enough metal overlap between Metal 1 and Metal 2, even though the minimum spacing is met.

Figure 3:
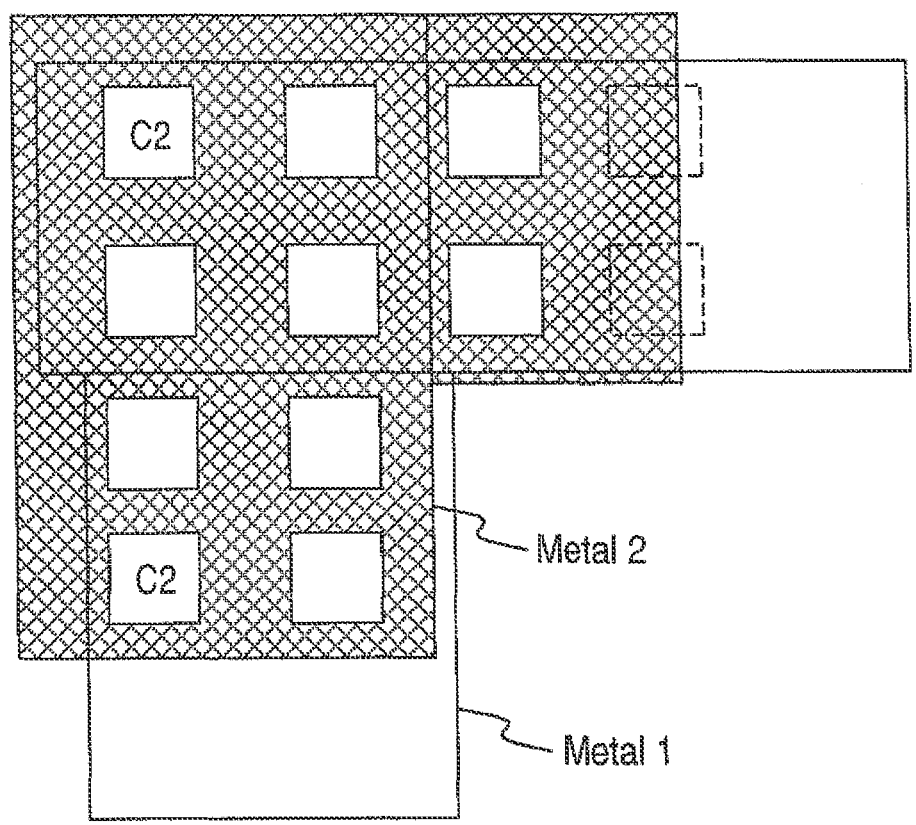
FIG. 3 illustrates a schematic top-down view of a semiconductor device in accordance with an embodiment of the present invention.

FIG. 3 is a top-down view illustrating the placement of additional vias on a thick metal. As illustrated in FIG. 3, additional vias (grey squares) can be placed along and around the original via C2 so long as design consideration are met. These additional vias are also placed following minimum spacing requirements. FIG. 3 illustrates the addition of as many additional vias as possible while still adhering to design dimensions and design rules. Further, the design considerations prevent vias from being placed at the dashed locations, as there is not enough metal overlap between Metal 1 and Metal 2.

Figure 4:
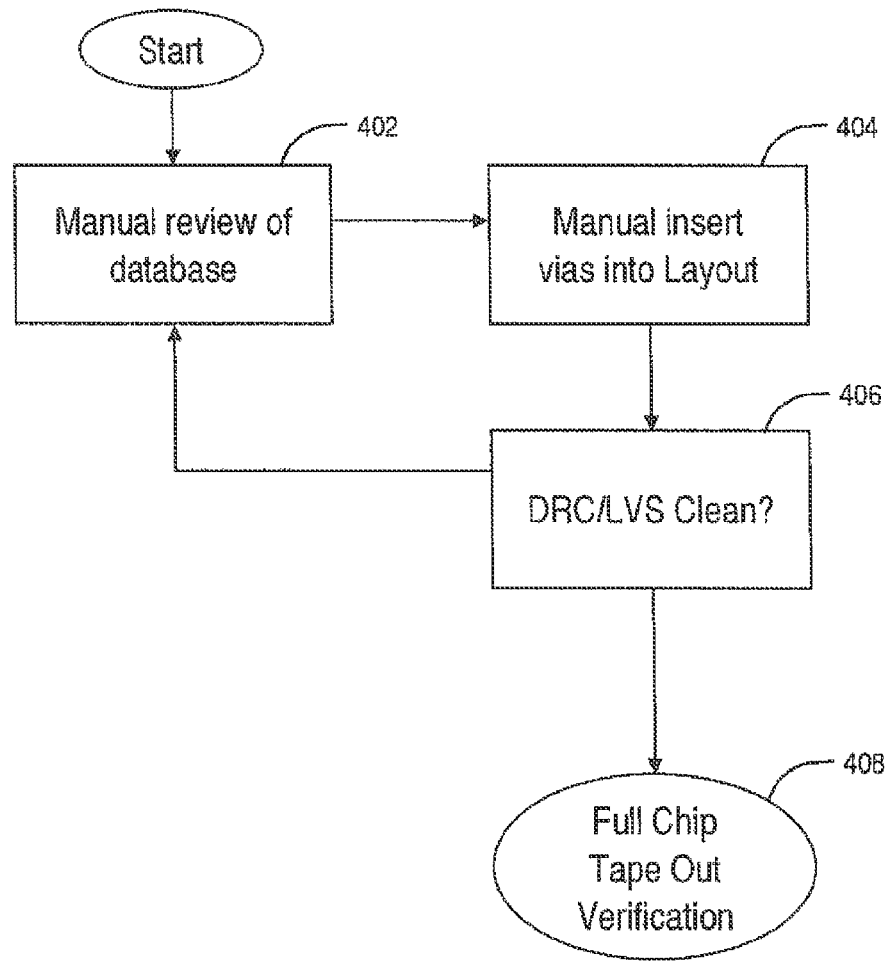
FIG. 4 illustrates the steps of a process for manually inserting additional vias into a layout pattern.

FIG. 4 illustrates the steps of a process for manually inserting additional vias into a layout pattern. In Step 402, a full semiconductor chip layout is reviewed for additional via placement, with each candidate location flagged. Such review and flagging is performed with the use of a database containing all cells and their layers of the reviewed semiconductor chip layout. As is well known in the art, a cell refers to those transistor structures and interconnections that form and provide a boolean logic function or storage function. As is also well known in the art, a cell is further divided into and formed from metal layers that are orientated one atop the other. It is these metal layers that are interconnected with vias and other electrical contacts.

As each new location for a via is identified during the analysis, it is so flagged in the database. In step 404, the candidate vias are manually laid out and inserted into the database. In step 406, a design rule check (DRC) and a Layout Versus Schematic (LVS) are performed on the candidate vias in the database. As is well known in the art, DRC(s) determine whether a particular semiconductor chip layout satisfies a set of parameters, such as spacing, width, etc. As is also well known in the art, LVS verification tests determine whether a particular semiconductor chip layout "corresponds" to the original circuit or schematic design of the semiconductor chip. If the DRC and LVS verification tests of step 406 pass, the full semiconductor chip tape out and verification may be performed in step 408. However, if the DRC and LVS tests of step 406 fail, the process returns to step 402, where the database is again reviewed and any necessary changes are made to the candidate vias in the database.

While the layout of a physically more robust design (through via doubling) may be performed manually, the eyeball review an entire full chip layout and then manually placing tens of thousands of vias into the layout could take many man-hours or even days of manual labor. Even if days of man-hours are expended to review an entire semiconductor chip layout, there is still no way to effectively ensure that all problematic areas would be accounted for.

DRC rule check may report single contacts/via areas in the form of tens of thousands of flags. Therefore, a significant amount of time will be required to manually review all the identified areas and then manually place vias into areas with single vias. It would therefore be more productive and more efficient to identify surrounding areas where additional vias may be placed (thereby improving redundancy) by editing polygons rather than actual physical "eye-ball" inspections.

In other words, an automated review of a layout database for a semiconductor chip, according to an embodiment of the present invention, can provide significant improvements in turnaround time and accuracy, while adding tens of thousands of additional vias into the layout database, while still adhering to the required design rules and other considerations.

Figure 5:
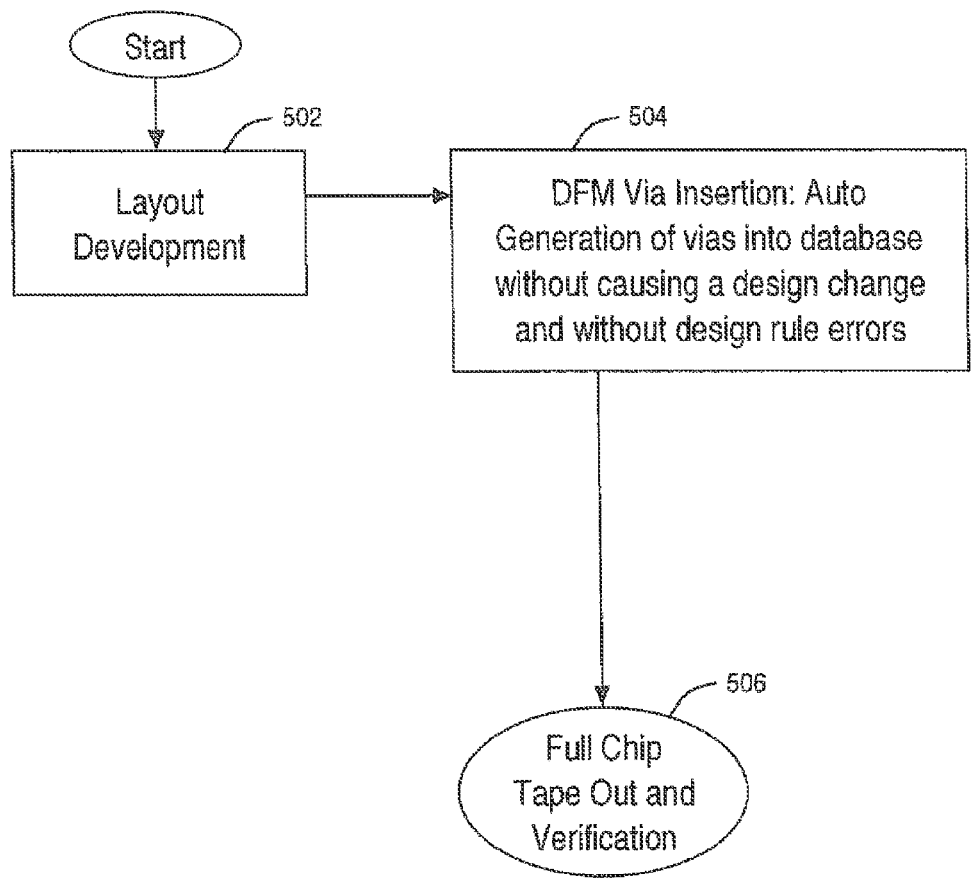
FIG. 5 illustrates the steps of a process for inserting additional vias into a layout pattern according to an embodiment of the present invention.

FIG. 5 illustrates the steps of an automated process for inserting additional vias into a layout pattern database. According to an embodiment of the present invention, the process of FIG. 5 starts in step 502 with the completion of a layout development for a semiconductor chip. In step 504, the layout database is reviewed to identify overlapping metal layers (e.g., metal 1 and metal 2 from FIG. 2 and FIG. 3) that contain one or more contacts or vias for each layer of each cell of the semiconductor chip layout. Step 504 continues by considering critical dimensions such as spacing and enclosure checks for contacts and metal layers that are involved. These considerations include a maximum allowable number of neighboring vias for a given area, as well as a minimum allowable number of neighboring vias for the given area. Next, the exclusion of necessary areas is considered. These exclusion areas, as discussed below, include those cells and layers where additional vias are not desired. Lastly, candidate via placements are selected and the vias are placed into the layout database while avoiding the necessity of introducing any design changes and without creating new design rule errors.

Figure 6:
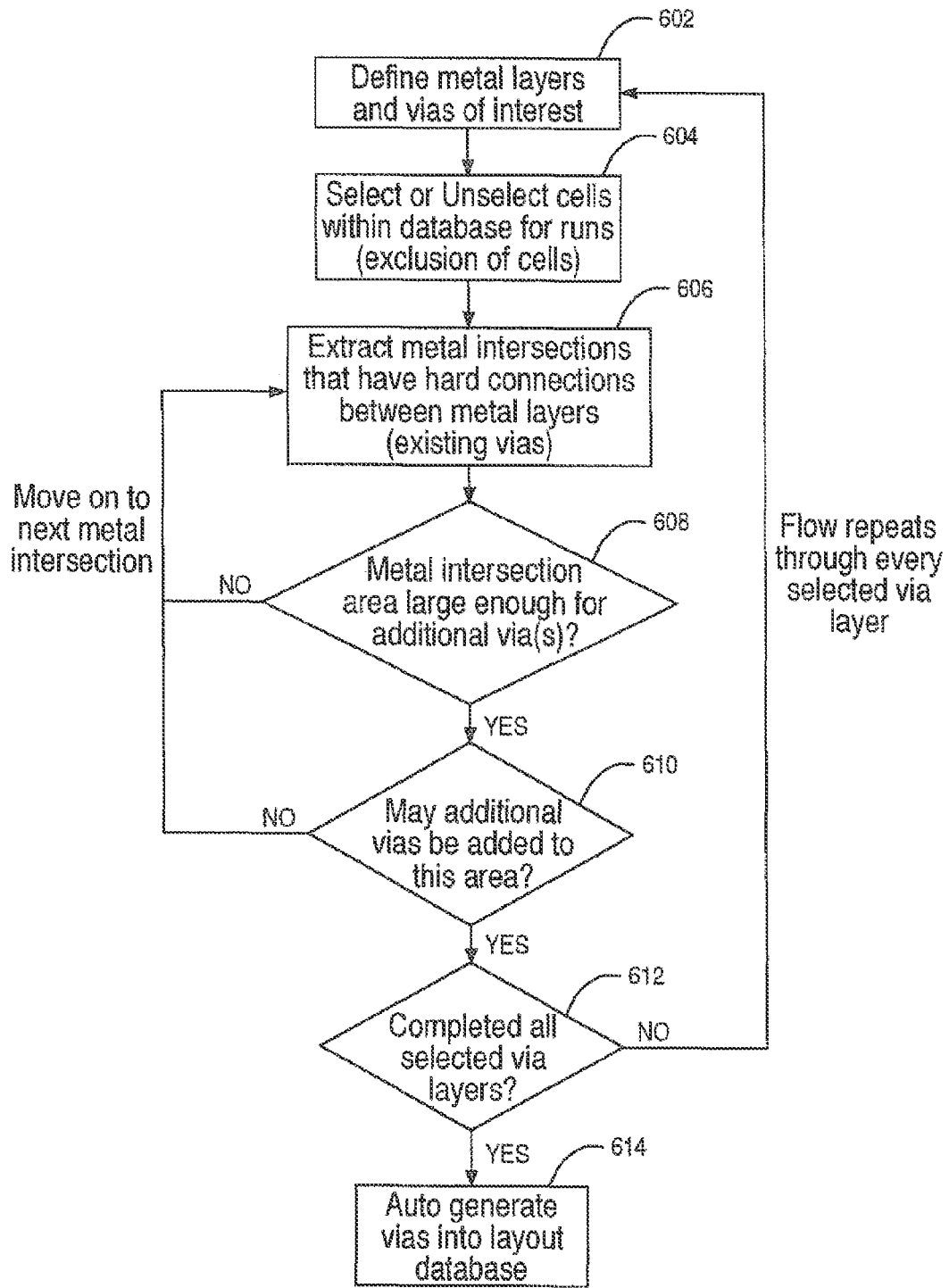
FIG. 6 illustrates a flow diagram, illustrating the steps to a method in accordance with an embodiment of the present invention.

FIG. 6 illustrates the steps of an automated process for inserting additional vias into a layout pattern database. According to an exemplary embodiment of the present invention, the process of FIG. 6 starts in step 602 with the identification of individual cells of the semiconductor chip layout, as well as the layers within those cells, that are to be considered by the process for improvement. In step 604, individual cells are also selected for exclusion. Or in other words, such cells are "unselected." By unselecting a cell, all layers within that cell and below its hierarchy will be excluded. This is mainly a flexibility option to avoid populating (with additional vias) a particular cell due to specific design requirements, such as special ESD cell requirements, or symmetrical circuitry related conditions, etc. From there, in step 606, the automated process will extract metal intersections with vias. In step 606, the layout database is reviewed to identify overlapping metal layers (e.g., metal 1 and metal 2 from FIG. 2 and FIG. 3) that contain one or more existing contacts or vias for each layer of each selected cell of the semiconductor chip layout. After identifying all the metal/metal intersections with existing vias, the process in step 608 will dimensionally fit as many additional vias into the areas surrounding the existing vias without increasing metal layer width or layout rerouting; while still adhering to design rule check (DRC) requirements, so as not to create any dimensional errors after the insertion of additional vias into the layout database.

As illustrated in step 610, areas within a particular cell (rather than the entire cell) can also be excluded from the automated via doubling. Such areas may include layers or whole cells where additional vias are not wanted or allowed. In step 612, the process will continue scanning through the whole layout database completing all concerned metal intersections and reviewing through all hierarchical levels of metal/metal intersections. Auto inserting (into the layout database) those extracted areas with generated vias will dramatically reduce manual layout work and turnaround time.

During the via generation process, the candidate vias are generated in a holding cell after all DRC and LVS tests and other considerations are met. After which, the vias are placed directly into the layout design at the top level. These additional vias can be easily removed if there is future enhancement in metal routing. In other words, any of the additionally generated vias can be easily removed as necessitated by future design changes to metal routing. With the addition of potentially tens of thousands of new vias, yield results will be improved as single vias sensitive defects (e.g., random, systematic and parametric defects) are minimized. Hence, this automated process will help to provide better yield throughout the entire semiconductor chip layout design.

The advantages of an automated process for placing individual vias into a semiconductor chip layout database are obvious. The insertion of an exemplary 15,000 additional vias into a layout database could take as many as 144 man-hours when performed manually, as opposed to only twenty minutes when performed with the exemplary automated tool. As the consideration of additional vias is usually applied close to tapeout, which is always under a time constraint, only a portion of the possible 15,000 additional vias will typically be considered using traditional, manual methods. Further, as noted above, even if all of the possible vias were considered and added to the layout database there is still no way to effectively ensure that all problematic areas would be accounted for.

The process is able to insert additional vias into all metal/metal intersections that still have sufficient space to accommodate more vias which directly distributes or reduces stress effects on each prior existing via. The process utilizes a layout editor and adds the additional generated vias directly into the database. This adding of the additional vias into the database takes 10-20 minutes depending on the number of vias generated. In total, it's a dramatic improvement when compared to manually reviewing and adding vias into the database by human labor. In other words, rather than manually reviewing all areas in the layout database to determine whether or not additional vias can be added, the via doubling process runs through all selected cells and layers and assigns as many additional vias as the individual metal/metal intersections are allowed, while still adhering to the original design rules. As noted above, this can be performed on the entire layout database, just a portion of it, just a single cell, or even just a single layer of that single cell, etc.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A process of automatic via doubling in a layout of a semiconductor device, comprising:
    selecting at least one cell of the layout for via doubling, wherein the at least one cell comprises at least two metal layers;
    selecting at least two metal layers of the at least one cell for via doubling;
    selecting metal/metal intersection areas out of the at least two metal layers using a computer, wherein a metal/metal intersection area comprises an existing via interconnecting the at least two metal layers; and
    dimensionally fitting additional vias into the selected metal/metal intersection areas, wherein the additional vias are placed into the layout, and wherein a maximum number of additional vias are fitted into each of the selected metal/metal intersection areas without changing metal layer dimensions or layout routing.

2. The process for automatic via doubling of claim 1, wherein portions of the at least one cell are excluded from the via doubling.

3. The process for automatic via doubling of claim 1, further comprising a plurality of cells, wherein at least one cell of the plurality of cells is excluded from the via doubling, wherein all metal layers of the excluded cell are also excluded from the via doubling.

4. The process for automatic via doubling of claim 1, wherein additional vias are added to a selected metal/metal intersection area while adhering to at least one of design rule check and layout versus schematic requirements.

5. The process for automatic via doubling of claim 1, wherein additional vias are added to a selected metal/metal intersection area without increasing metal layer width and without requiring layout rerouting.

6. The process for automatic via doubling of claim 1, wherein a cell comprises a plurality of transistor structures providing one of a Boolean logic function and a storage function.

7. The process for automatic via doubling of claim 1, wherein the layout is contained in a database.

8. A non-transitory computer readable media comprising computer-executable instructions stored therein for automatic via doubling in a layout of a semiconductor device, the computer-executable instructions comprising:
   instructions to select at least one cell of the layout for via doubling, wherein the at least one cell comprises at least two metal layers;
   instructions to select at least two metal layers of the at least one cell for via doubling;
   instructions to select metal/metal intersection areas out of the at least two metal layers, wherein a metal/metal intersection area comprises an existing via interconnecting the at least two metal layers; and
   instructions to dimensionally fit additional vias into the selected metal/metal intersection areas, wherein the additional vias are placed into the layout, and wherein a maximum number of additional vias are fitted into each of the selected metal/metal intersection areas without changing metal layer dimensions or layout routing.

9. The non-transitory computer readable media of claim 8, wherein portions of the at least one cell are excluded from the via doubling.

10. The non-transitory computer readable media of claim 8, further comprising a plurality of cells, wherein at least one cell of the plurality of cells is excluded from the via doubling, wherein all metal layers of the excluded cell are also excluded from the via doubling.

11. The non-transitory computer readable media of claim 8, wherein additional vias are added to a selected metal/metal intersection area while adhering to at least one of design rule check and layout versus schematic requirements.

12. The non-transitory computer readable media of claim 8, wherein additional vias are added to a selected metal/metal intersection area without increasing metal layer width and without requiring layout rerouting.

13. The non-transitory computer readable media of claim 8, wherein a cell comprises a plurality of transistor structures providing one of a Boolean logic function and a storage function.

14. The non-transitory computer readable media of claim 8, wherein the layout is contained in a database.

15. An apparatus for automatic via doubling in a layout of a semiconductor device, comprising:
   a means for selecting at least one cell of the layout for via doubling, wherein the at least one cell comprises at least two metal layers;
   a means for selecting at least two metal layers of the at least one cell for via doubling;
   a means for selecting metal/metal intersection areas out of the at least two metal layers, wherein a metal/metal intersection area comprises an existing via interconnecting the at least two metal layers; and
   a means for dimensionally fitting additional vias into the selected metal/metal intersection areas, wherein the additional vias are placed into the layout, and wherein a maximum number of additional vias are fitted into each of the selected metal/metal intersection areas without changing metal layer dimensions or layout routing.

16. The apparatus of claim 15, wherein portions of the at least one cell are excluded from the via doubling.

17. The apparatus of claim 15, further comprising a plurality of cells, wherein at least one cell of the plurality of cells is excluded from the via doubling, wherein all metal layers of the excluded cell are also excluded from the via doubling.

18. The process for via fill generation of claim 15, wherein additional vias are added to a selected metal/metal intersection area while adhering to at least one of design rule check and layout versus schematic requirements.

19. The process for via fill generation of claim 15, wherein additional vias are added to a selected metal/metal intersection area without increasing metal layer width and without requiring layout rerouting.

20. The process for via fill generation of claim 15, wherein a cell comprises a plurality of transistor structures providing one of a Boolean logic function and a storage function.

21. The process for via fill generation of claim 15, wherein the layout is contained in a database.

* * * * *